United States Patent
Lepo et al.

(10) Patent No.: US 10,907,307 B2
(45) Date of Patent: Feb. 2, 2021

(54) CATIONIC SURFACE SIZING AGENT

(71) Applicant: Kemira OYJ, Helsinki (FI)

(72) Inventors: Anneli Lepo, Tampere (FI); Elsi Turunen, Espoo (FI); Tarja Turkki, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 16/062,550

(22) PCT Filed: Dec. 28, 2016

(86) PCT No.: PCT/FI2016/050931
§ 371 (c)(1),
(2) Date: Jun. 14, 2018

(87) PCT Pub. No.: WO2017/115012
PCT Pub. Date: Jul. 6, 2017

(65) Prior Publication Data
US 2019/0003124 A1    Jan. 3, 2019

(30) Foreign Application Priority Data

Dec. 31, 2015   (FI) ................................. 20156045

(51) Int. Cl.
*D21H 21/16*    (2006.01)
*D21H 17/45*    (2006.01)
(Continued)

(52) U.S. Cl.
CPC .............. *D21H 21/16* (2013.01); *C08F 2/22* (2013.01); *C08F 212/08* (2013.01);
(Continued)

(58) Field of Classification Search
None
See application file for complete search history.

(56) References Cited

U.S. PATENT DOCUMENTS 6,315,824 B1    11/2001  Lauzon
6,802,939 B1    10/2004  Donnelly et al.
(Continued)

FOREIGN PATENT DOCUMENTS

CN    101148842 A    3/2008
CN    102230301 A    11/2011
(Continued)

OTHER PUBLICATIONS

"Acetic Anhydride", Chemical Datasheet, Cameo Chemicals, 6 pages 2019, [online], retrieved from the Internet, [retrieved Nov. 16, 2019], <URL: https://cameochemicals.noaa.gov/report?key=CH2276>. (Year: 2019).*

(Continued)

*Primary Examiner* — Dennis R Cordray
(74) *Attorney, Agent, or Firm* — Buchanan Ingersoll & Rooney PC

(57) ABSTRACT

Provided herein is an aqueous polymer dispersion (A) obtainable by free radical emulsion copolymerizing a first ethylenically unsaturated monomer blend having 15 to 100% by weight of at least one C1-C4-alkyl (meth)acrylate, in the presence of a water-soluble redox system having a first free radical initiator for free radical emulsion copolymerization and an aqueous prepolymer composition (B) obtainable by free radical emulsion copolymerizing in a polymerization solvent having C1-6-carboxylic acid and C1-6-carboxylic acid anhydride a second ethylenically unsaturated monomer blend with 5 to 50% by weight of at least one ethylenically unsaturated quaternary amine, and 10 to 95% by weight of at least one optionally substituted styrene, in the presence of a second free radical initiator.

14 Claims, 1 Drawing Sheet

(51) Int. Cl.
*D21H 13/08* (2006.01)
*C08F 220/34* (2006.01)
*C08F 220/64* (2006.01)
*C08F 220/66* (2006.01)
*C08F 267/02* (2006.01)
*C08F 2/22* (2006.01)
*C08F 212/08* (2006.01)
*C08F 257/02* (2006.01)
*D21H 17/37* (2006.01)
*D21H 23/56* (2006.01)
*C08K 3/20* (2006.01)
*C08F 220/18* (2006.01)

(52) U.S. Cl.
CPC .......... *C08F 220/34* (2013.01); *C08F 220/64* (2013.01); *C08F 220/66* (2013.01); *C08F 257/02* (2013.01); *D21H 13/08* (2013.01); *D21H 17/37* (2013.01); *D21H 17/375* (2013.01); *D21H 17/45* (2013.01); *D21H 17/455* (2013.01); *D21H 23/56* (2013.01); *C08F 220/1804* (2020.02); *C08K 3/20* (2013.01)

(56) References Cited

U.S. PATENT DOCUMENTS

| | | | |
|---|---|---|---|
| 8,685,207 | B2 | 4/2014 | Song et al. |
| 8,901,227 | B2 | 12/2014 | Song et al. |
| 9,481,785 | B2 | 11/2016 | Song et al. |
| 2002/0040088 | A1 | 4/2002 | Hauschel et al. |
| 2008/0039598 | A1 | 2/2008 | Kukula et al. |
| 2010/0022701 | A1 | 1/2010 | Brockmeyer et al. |
| 2012/0083563 | A1 | 4/2012 | Song et al. |
| 2012/0180970 | A1 | 7/2012 | Song et al. |
| 2013/0245168 | A1 | 9/2013 | Song et al. |
| 2014/0017505 | A1 | 1/2014 | Sodeyama et al. |

FOREIGN PATENT DOCUMENTS

| | | | |
|---|---|---|---|
| CN | 102459369 | A | 5/2012 |
| CN | 102656192 | A | 9/2012 |
| CN | 103415539 | A | 11/2013 |
| JP | 2001-262495 | A | 9/2001 |
| JP | 2001-295197 | A | 10/2001 |
| JP | 2009242686 | A | 10/2009 |
| RU | 2235819 | C2 | 9/2004 |
| RU | 2258727 | C2 | 8/2005 |
| RU | 2281294 | C2 | 8/2006 |
| RU | 2282637 | C2 | 8/2006 |
| SU | 332099 | A1 | 3/1972 |

OTHER PUBLICATIONS

Smook, Gary A., Handbook for Pulp and Paper Technologists, 2nd ed, Angus Wilde Publications, 1992, p. 209. (Year: 1992).*
Fox et al, Organic Chemistry, 2nd ed., Jones and Bartlett Publishers, Inc., pp. 629-630. (Year: 1997).*
J. Mitchell et al., "Aquametry", Foreign Literature Publishing House, 1952, with English Translation. (4 pages).
The extended European Search Report dated Jul. 30, 2019, by the European Patent Office in corresponding European Application No. 16881326.9. (6 pages).
Office Action (Inquiry) dated Apr. 8, 2019, by the Russian Patent Office in corresponding Russian Patent Application No. 2018125969/05, and an English Translation of the Office Action. (19 pages).
Office Action (Inquiry) dated Jul. 3, 2019, by the Russian Patent Office in corresponding Russian Patent Application No. 2018125969/05, and an English Translation of the Office Action. (9 pages).
*International Search Report (PCT/ISA/210) dated Mar. 9, 2017, by the Finnish Patent Office as the International Searching Authority for International Application No. PCT/FI2016/050931.
*Written Opinion (PCT/ISA/237) dated Mar. 9, 2017, by the Finnish Patent Office as the International Searching Authority for International Application No. PCT/FI2016/050931.
*Finnish Search Report dated Jun. 29, 2016.
*Frida Iselau et al., Role of the aggregation behavior of hydrophobic particles in paper surface hydrophobation, Colloids and Surfaces A: Physicochemical and Engineering Aspects, vol. 483, 2015, pp. 264-270.
First Office Action dated May 8, 2020, by the Chinese Patent Office in corresponding Chinese Patent Application No. 201680076712.9, and an English Translation of the Office Action. (19 pages).

* cited by examiner

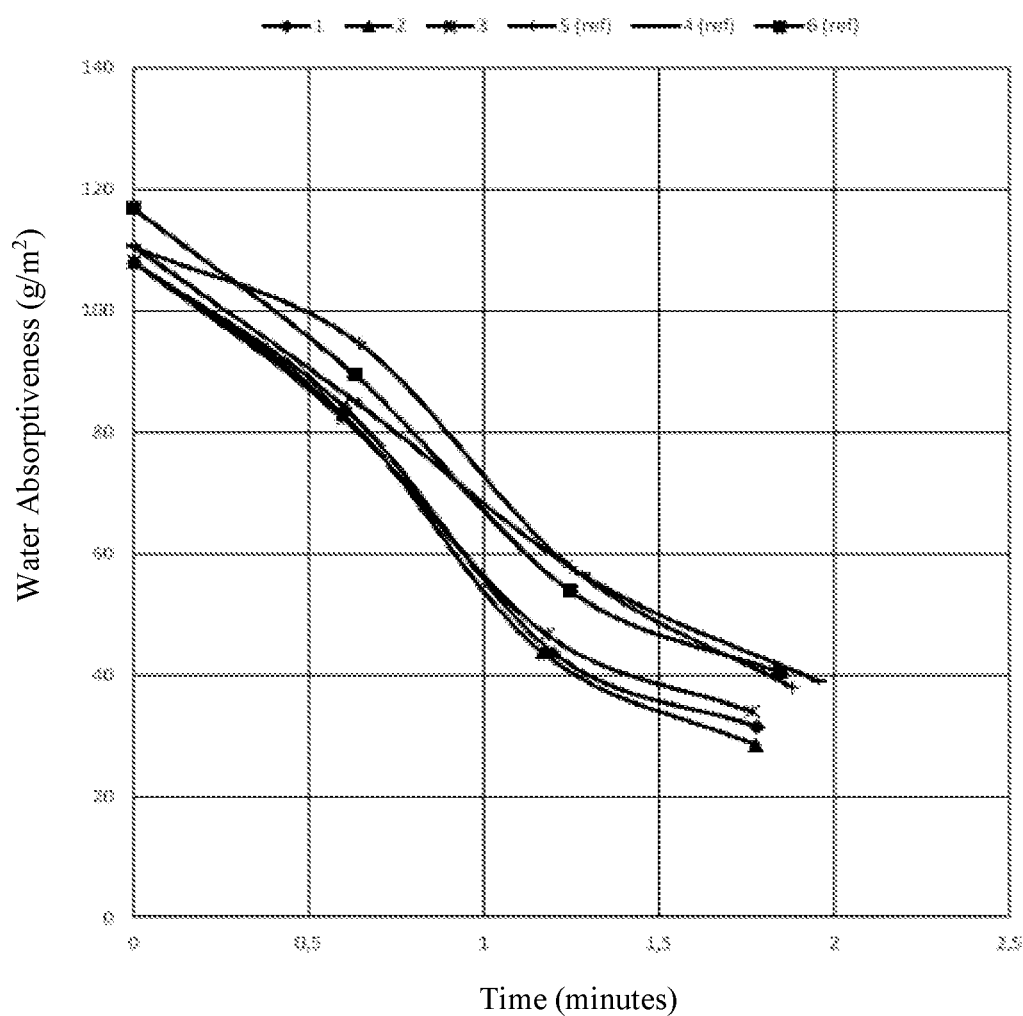

CATIONIC SURFACE SIZING AGENT

FIELD OF THE INVENTION

The present invention relates to surface sizing of paper and paperboard, in particularly to a cationic aqueous polymer dispersions for surface sizing of paper and paperboard.

BACKGROUND OF THE INVENTION

Polystyrene acrylates, which contain cationic polymeric stabilizer/protective colloid and polystyrene acrylate hydrophobation polymer and are polymerized with the two-stage polymerization, are widely utilized in surface sizing. So far water containing quaternary amine acrylate monomers have been used together with tertiary amine acrylates because high ratio of water containing quaternary amine acrylate increases particle size distribution of the dispersion. One of the disadvantages associated with existing cationic sizing agents is that due to too high particle size the sizing performance is weak.

BRIEF DESCRIPTION OF THE INVENTION

An object of the present invention is thus to provide a (polystyrene) acrylate based sizing agent overcoming the above problems. The objects of the invention are achieved by an aqueous polymer dispersion, a method for the preparation of said aqueous polymer dispersion, a sizing composition comprising said aqueous polymer dispersion and a sizing method utilizing said aqueous dispersion which are characterized by what is stated in the independent claims. The preferred embodiments of the invention are disclosed in the dependent claims.

The invention is based on the surprizing realization that provision of a prepolymer dispersion comprising at least one ethylenically unsaturated quaternary amine selected from quaternary salt of N,N,N-tri(C1-4-alkyl)amino C1-4-alkyl (meth)acrylate with a mineral acid or an organic acid and/or quaternary salt of N,N,N-tri(C1-4-alkyl)amino C1-4-alkyl (meth)acrylamide with a mineral acid or an organic acid and obtainable by performing the dispersion polymerization in a polymerization solvent comprising C1-6-carboxylic acid and C1-6-carboxylic anhydride allows preparation of aqueous polymer dispersions that are particularly efficient surface sizing agents in the manufacture of paper and paperboard.

BRIEF DESCRIPTION OF THE DRAWINGS

In the following the invention will be described in greater detail by means of preferred embodiments with reference to the attached drawings, in which FIG. 1 shows the water absorptiveness as determined by the Cobb method.

DETAILED DESCRIPTION OF THE INVENTION

Provided herein is an aqueous polymer dispersion (A) obtainable by free radical emulsion copolymerizing a first ethylenically unsaturated monomer blend comprising (a) 0 to 75% by weight of at least one optionally substituted styrene, (b) 15 to 100% by weight of at least one C1-C4-alkyl (meth)acrylate, and (c) 0 to 10% by weight of other ethylenically unsaturated copolymerizable monomers, wherein the sum (a)+(b)+(c) is 100%, in the presence of a first free radical initiator and an aqueous prepolymer composition (B) obtainable by free radical copolymerizing, in a polymerization solvent comprising C1-6-carboxylic acid and C1-6-carboxylic anhydride a second ethylenically unsaturated monomer blend comprising (i) 5 to 50% by weight of at least one ethylenically unsaturated quaternary amine selected from quaternary salt of N,N,N-tri(C1-4-alkyl)amino C1-4-alkyl(meth)acrylate with a mineral acid or an organic acid and/or quaternary salt of N,N,N-tri(C1-4-alkyl)amino C1-4-alkyl(meth)acrylamide with a mineral acid or an organic acid, (ii) 0 to 40% by weight of at least one ethylenically unsaturated tertiary amine selected from N,N-di(C1-4-alkyl) amino C1-4-alkyl(meth)acrylate and/or N,N-di(C1-4-alkyl) amino C1-4-alkyl(meth)acrylamide, (iii) 10 to 95% by weight of at least one optionally substituted styrene, (iv) 0 to 50% by weight of at least one C1-C4-alkyl (meth)acrylate, and (v) 0 to 10% by weight of other ethylenically unsaturated copolymerizable monomers, wherein the sum (i)+(ii)+(iii)+(iv)+(v) is 100%, in the presence of a second free radical initiator, and adding water to the obtained polymer composition to obtain the aqueous prepolymer composition.

The present aqueous polymer dispersion (A) may be obtained by emulsion polymerization of a first ethylenically unsaturated monomer blend in the presence of an aqueous prepolymer composition (B). This stage is herein referred to as the second polymerization stage.

The aqueous prepolymer composition (B) may be prepared from a second ethylenically unsaturated monomer blend comprising, in particular, (i) at least one ethylenically unsaturated quaternary amine selected from quaternary salt of N,N,N-tri(C1-4-alkyl)amino C1-4-alkyl(meth)acrylate with a mineral acid or an organic acid and/or quaternary salt of N,N,N-tri(C1-4-alkyl)amino C1-4-alkyl(meth)acrylamide with a mineral acid or an organic acid, in the presence of a (second) polymerization initiator in a polymerization solvent comprising C1-6-carboxylic acid and C1-6-carboxylic acid anhydride. This stage is herein referred to as the first polymerization stage.

Accordingly further provided herein is a process for the preparation of an aqueous polymer dispersion as defined herein and hereafter, comprising free radical polymerizing, in a polymerization solvent comprising C1-6-carboxylic acid and C1-6-carboxylic acid anhydride, in the presence of a second free radical initiator a second ethylenically unsaturated monomer blend comprising (i) 5 to 50% by weight of at least one ethylenically unsaturated quaternary amine selected from quaternary salt of N,N,N-tri(C1-4-alkyl)amino C1-4-alkyl(meth)acrylate with a mineral acid or an organic acid and/or quaternary salt of N,N,N-tri(C1-4-alkyl)amino C1-4-alkyl(meth)acrylamide with a mineral acid or an organic acid, (ii) 0 to 40% by weight of at least one ethylenically unsaturated tertiary amine selected from N,N-di(C1-4-alkyl) amino C1-4-alkyl(meth)acrylate and/or N,N-di(C1-4-alkyl) amino C1-4-alkyl(meth)acrylamide, (iii) 10 to 95% by weight of at least one optionally substituted styrene, (iv) 0 to 50% by weight of at least one C1-C4-alkyl (meth)acrylate, and (v) 0 to 10% by weight of other ethylenically unsaturated copolymerizable monomers, wherein the sum (i)+(ii)+(iii)+(iv)+(v) is 100%, adding water to the obtained polymer composition to obtain an aqueous prepolymer composition (B) and copolymerizing in the presence of said aqueous prepolymer composition (B) and a water-soluble redox systems comprising a first free radical initiator for the free radical emulsion copolymerization a first ethylenically unsaturated monomer blend comprising (a) 0 to 75% by weight of at least one optionally substituted styrene, (b) 15 to 100% by weight of at least one C1-C4-alkyl (meth)acrylate, and (c) 0 to 10% by weight of other ethylenically unsaturated copolymerizable monomers, wherein the sum (a)+(b)+(c) is 100% to obtain an aqueous polymer dispersion (A).

The amount of monomer(s) of group (i) is up to 50% of the total weight of the second ethylenically unsaturated monomer blend. Typically the amount of monomer(s) of group (i) is 10 to 40%, preferably 15 to 30% of the total weight of the second ethylenically unsaturated monomer blend.

The second ethylenically unsaturated monomer blend may also comprise up to 40% by weight of monomer(s) of group (ii) of the total weight of the second ethylenically unsaturated monomer blend i.e. at least one ethylenically unsaturated tertiary amine selected from N,N-di(C1-4-alkyl) amino C1-4-alkyl (meth)acrylate and/or N,N-di(C1-4-alkyl) amino C1-4-alkyl(meth)acrylamide. However, the presence of unsaturated tertiary amine monomers is not required for obtaining the desired sizing properties and/or particle size. Thus the presence of (ii) is not required in the prepolymer composition, but is tolerated. Preferably the amount of monomer(s) of group (ii) is 0%. When (ii) is present in the prepolymer composition, the amount of (ii) should not exceed that of (i). Thus the ratio of (i) and (ii) is preferably 1:<1.

The second ethylenically unsaturated monomer blend further comprises 10 to 95% by weight of monomer(s) of group (iii) of the total weight of the second ethylenically unsaturated monomer blend. Preferably the amount of monomer(s) of group (iii) is 60 to 80% of the total weight of the second ethylenically unsaturated monomer blend.

The second ethylenically unsaturated monomer blend may also comprise up to 50% by weight of monomer(s) of group (iv) of the total weight of the second ethylenically unsaturated monomer blend. However the presence monomers of group (iv) is not required. Thus preferably the amount of monomer(s) of group (iv) is 0%.

The second ethylenically unsaturated monomer blend may also comprise up to 10% by weight of monomer(s) of group (v) of the total weight of the second ethylenically unsaturated monomer blend. However the presence monomers of group (v) is not required. Thus preferably the amount of monomer(s) of group (v) is 0%.

In the first polymerization stage, monomers (i) to (v) are polymerized by a solution polymerization method in a polymerization solvent which may also comprise water. This water is typically comprised in the monomer starting materials. Examples of C1-6-carboxylic acids include formic acid, acetic acid, propionic acid, and butyric acid. Preferred C1-6-carboxylic acid is acetic acid. C1-C6-monocarboxylic acids and saturated C1-C6-dicarboxylic acids may be used, saturated C1-C6-monocarboxylic acids preferably being used. The saturated C1-C6-carboxylic acids may optionally carry further substituents such as hydroxyl groups. The solution polymerization is preferably carried out in formic acid, acetic acid, propionic acid, butyric acid, isobutyric acid, valeric acid, isovaleric acid, caproic acid, hydroxypropionic acid or hydroxybutyric acid. Mixtures of different saturated C1-C6-carboxylic acids may also be used. The solution polymerization is preferably carried out in formic acid, acetic acid, propionic acid or hydroxypropionic acid, particularly preferably in acetic acid. Examples of C1-6-carboxylic anhydrides include formic anhydride, acetic anhydride, propionic anhydride, and butyric anhydride. The anhydrides may also carry substituents such as hydroxyl groups. Preferred C1-6-carboxylic anhydride is acetic anhydride.

In the first polymerization stage, the monomers are used in relation to the polymerization solvent in an amount such that initial prepolymer compositions having a polymer content of from 10 to 40% by weight, preferably from 13 to 20% by weight, are obtained. This does not include the amount of water added after the polymerization stage. The aqueous prepolymer composition (B), to which water has been added, is then used in the second stage of the polymerization. In the second stage of the polymerization, from 0.1 to 10, preferably from 0.8 to 3, parts by weight, based on 1 part by weight of the prepolymer, of a first ethylenically unsaturated monomer blend is used.

Preferably the first polymerization stage for the preparation of the aqueous prepolymer composition (B) is performed in the presence of at least one polymerization regulator. Suitable polymerization regulators include, for example, mercaptans, such as ethyl mercaptan, n-butyl mercaptan, tert-butyl mercaptan, n-dodecyl mercaptan and tetradodecyl mercaptan. When polymerization regulators are used, the amounts of the polymerization regulator is preferably from 0.1 to 10% by weight, preferably for 0.3 to 5% by weight. The polymers prepared in the first stage have a relatively low molar mass, e.g. Mw from 1000 to 100 000, preferably from 5000 to 50 000 (as determined by size exclusion chromatography). The determination of the molecular weight distribution and of the mass average molecular weight can be carried out by methods known to a person skilled in the art, such as, for example, gel permeation chromatography, light scattering or ultracentrifuging.

Monomers of group (i) include quaternary salts of N,N, N-tri(C1-4-alkylamino C1-4-alkylacrylates, N,N,N-tri(C1-4-alkyl)amino C1-4-alkylmethacrylates, N,N,N-tri(C1-4-alkyl)amino C1-4-alkylacrylamides, N,N,N-tri(C1-4-alkyl) amino C1-4-alkylmethacrylamides and mixtures thereof. The cationic groups may also originate from monomers selected from 2-(dimethylamino)ethyl acrylate benzylchloride, 2-(dimethylamino)ethyl acrylate dimethylsulphate, 2-dimethylaminoethyl methacrylate dimethylsulphate, and diallyldimethylammonium chloride. Preferably monomers of group (i) include quaternary salts of N,N,N-tri(C1-4-alkyl)amino C1-4-alkylacrylates, N,N,N-tri(C1-4-alkyl) amino C1-4-alkylmethacrylates and mixture thereof. Preferred examples of group (i) include quaternary salts of N,N,N-trimethylamino C1-4-alkylacrylates and N,N,N-trimethylamino C1-4-alkylmethacrylates with mineral acid, such as quaternary salts of N,N,N-trimethylamino ethyl (meth)acrylates with HCl. Particularly preferred monomers of group are [2-(methacryloyloxy) ethyl]trimethylammonium chloride and [2-(acryloyloxy)ethyl]trimethylammoniumchloride.

Monomers of group (ii) include, for example, tertiary amines N,N-di(C1-4-alkyl)amino C1-4-alkylacrylates, N,N-di(C1-4-alkyl)amino C1-4-alkylmethacrylates, N,N-di(C1-

4-alkyl)amino C1-4-alkylacrylamides, N,N-di(C1-4-alkyl) amino C1-4-alkylmethacrylamides and mixtures thereof, preferably tertiary amines N,N-di(C1-4-alkyl)amino C1-4-alkylacrylates, N,N-di(C1-4-alkyl)amino C1-4-alkylmethacrylates and mixture thereof. Preferred examples of group (ii) include tertiary amines N,N-dimethylamino C1-4-alkylacrylates and N,N-dimethylamino C1-4-alkylmethacrylates, such as N,N-dimethylamino ethyl(meth)acrylates. Particularly preferred monomers of group (ii) are dimethylaminoethyl methacrylate and dimethylaminoethyl acrylate, dimethylaminopropyl methacrylate.

The copolymerization in the first polymerization stage is effected in the presence of a second free radical initiator. Suitable second free radical initiators are, for example, azoinitiators such as 2,2'-azobis(2-methylpropionitrile, 2,2'-azobis(2-methylbutyronitrile, dimethyl 2,2'-azobis(2-methyl propionate) or 1,1,3,3-tetramethylbutyl peroxy-2-ethylhexanoate, or peroxides such as hydrogen peroxide, sodium peroxo-disulfate, potassium peroxodisulfate, ammonium peroxodisulfate, dibenzoyl peroxide, di-tert-butyl peroxide, tert-butyl hydroperoxide, cumyl hydroperoxide or bis-cyclohexyl peroxydicarbonate. Preferably the second free radical initiator is 2,2'-azobis(2-methylpropionitrile).

The copolymerization in the first polymerization stage may further be effected in the presences of a chain transfer agent. Suitable chain transfer agents are, for example, sulfur compounds, e.g. mercaptans, di and polysulfides, esters and sulfides of thio- and dithiocarboxylic acids and enol sulfides. Halogen compounds, aldehydes, ketones, formic acid, enol ethers, enamines, hydroxylamine, halogenated hydrocarbons, alcohols, ethylbenzene and xylene may also be used. Examples of regulators based on sulfur containing organic compounds include mercaptoethanol, mercaptopropanol, mercaptobutanol, thioglycolic acid, thioacetic acid, thiopropionic acid, 1-dodecanthiol, thioethanolamine, sodium dimethyidithiocarbamate, cysteine, ethyl thioglycolate, trimethylolpropane trithioglycolate, pentaerythrityl tetra (mercaptopropionate), pentaerythrityl tetrathioglycolate, trimethylolpropane tri(mercaptoacetate), butyl methylenebisthioglycolate, thioglycerol, glyceryl monothioglycolate, n-octadecyl mercaptan, n-dodecyl mercaptan, tert-dodecyl mercaptan, butyl mercaptan, thiophenol, mercaptotrimethoxysilane and acetylcysteine. Preferably the chain transfer agent is dodecyl mercaptane.

The first polymerization stage can be carried out both by a feed process and by a batch process at temperatures from 110 to 150° C., preferably from 115 to 130° C. If the polymerization temperature should be above the boiling point of the solvent used, the polymerization is carried out under superatmospheric pressure, for example in an autoclave equipped with a stirrer.

The first polymerization stage is completed by addition of water to provide the produced prepolymer as an aqueous prepolymer composition, either in a form of dispersion or solution. The concentration of the prepolymer prepared in the first polymerization stage in the aqueous prepolymer composition (B), into which water has been added is, for example, from 10 to 40, preferably from 13 to 20, % by weight.

The obtained aqueous prepolymer composition (B) is then subjected to the second polymerization stage where it is copolymerized with a first ethylenically unsaturated monomer blend in the presence of (first) free radical initiators which form free radicals under the polymerization conditions to obtain the desired aqueous polymer dispersion (A).

Examples of suitable monomers of group (a) and the group (iii) include styrene and substituted styrenes, such as α-methylstyrene, vinyltoluene, ethylvinyltoluene, chloromethylstyrene, and mixtures thereof.

Examples of suitable monomers of group (b) and the group (iv) include C1-C4-alkyl acrylates, C1-C4-alkyl methacrylates or mixtures thereof, such as n-butyl acrylate, iso-butyl acrylate, tert-butyl acrylate, and 2-butyl acrylate and the corresponding butyl methacrylates n-butyl methacrylate, iso-butyl methacrylate, tert-butyl methacrylate, and 2-butyl methacrylate, and furthermore methyl acrylate, methyl methacrylate, ethyl acrylate, ethyl methacrylate, propyl acrylate or propyl methacrylate.

Suitable monomers of the group (c) and the group (v) are further ethylenically unsaturated monomers, such as ethylhexyl acrylate, stearyl acrylate, stearyl methacrylate and further esters of acrylic and methacrylic acid with alcohols which have more than four C atoms, and furthermore acrylonitrile, methacrylonitrile, acrylamide, vinyl acetate or anionic comonomers, such as acrylic acid, methacrylic acid, styrenesulphonic acid. Particularly preferred monomers of group (d) are acrylic acid and styrenesulphonic acid.

The monomers of the first polymer blend are chosen in the second polymerization stage so that the glass transition temperature of the resulting copolymer is from −15 to +80° C. Preferably the glass transition temperature of the copolymer in the second polymerization stage is from 30 to 75° C.

The first ethylenically unsaturated monomer blend may comprise up to 75% by weight of monomer(s) of group (a) of the total weight of the first ethylenically unsaturated monomer blend. However, the presence monomers of group (a) is not required. Thus the amount of monomer(s) of group (a) may be 0%. Preferably the amount of monomer(s) of group (a) is 0 to 50% by weight, more preferably 5 to 45% by weight, of the total weight of the first ethylenically unsaturated monomer blend.

The first ethylenically unsaturated monomer blend may comprise up to 100% by weight of monomer(s) of group (b) of the total weight of the first ethylenically unsaturated monomer blend.

The prevailing monomer(s) of the first ethylenically unsaturated monomer blend may be either monomer(s) of group (a) or monomer(s) of group (b). Preferably the amount of monomer(s) of group (b) is over 50%, more preferably from 50 to 100% by weight, even more preferably 55 to 95% by weight, of the total weight of the first ethylenically unsaturated monomer blend.

The first ethylenically unsaturated monomer blend may also comprise up to 10% by weight of monomer(s) of group (c) of the total weight of the first ethylenically unsaturated monomer blend. However the presence monomer(s) of group (c) is not required. Thus preferably the amount of monomer(s) of group (c) is 0%.

The second polymerization stage is carried out as a rule by a procedure wherein the monomers of the first monomer blend, either individually or as a mixture, and the free radical initiators suitable for initiating the polymerization are added to the aqueous prepolymer composition (B).

The second polymerization stage can be carried out either by a feed process and by a batch process at temperatures from 40 to 105° C., preferably from 50 to 100° C. If the polymerization temperature should be above the boiling point of the solvent used, the polymerization is carried out under superatmospheric pressure, for example in an autoclave equipped with a stirrer.

Both polymerization stages are usually carried out in the absence of oxygen, preferably in an inert gas atmosphere, for example under nitrogen. During the polymerization, thorough mixing with the aid of a suitable stirrer should be ensured.

In the second polymerization stage a water-soluble redox system is utilized for initiating the polymerization. The oxidant of the redox system can be for example, hydrogen peroxide, sodium peroxo-disulfate, potassium peroxodisulfate, ammonium peroxodisulfate. The reductant can be for example reducing agent such as sodium sulfite, sodium pyrosulfite, sodium bisulfite, sodium dithionite, sodium hydroxymethanesulfinate or ascorbic acid, or metal salt such as cerium, manganese or iron(II) salt. Preferably hydrogen peroxide is utilized as the first free-radical initiator. Suitable water-soluble initiator systems include redox systems comprising as a redox system hydrogen peroxide and metal ions such as cerium, manganese or iron(II) salts. A redox system comprising hydrogen peroxide and an iron(II) salt, such as iron(II)sulfate, gives fine-particled dispersions.

In the second polymerization stage polymerization is usually carried out in such a way that the metal salt of the redox system, such as, for example, the iron(II) salt, is added to the batch before the polymerization, while hydrogen peroxide is added in simultaneously with the monomers but separately. Iron(II) salt is usually used in concentrations of 5 to 200 mg/L $Fe^{++}$ ion, based on the total dispersion, higher or lower concentrations also being possible. Hydrogen peroxide (calculated as 100%) is added in concentrations of 0.2 to 2.0% by weight, based on monomer.

Polymerization with the redox system comprising hydrogen peroxide and metal ions gives fine-particled dispersions having a good sizing effect. Completion of the polymerization may be ensured for example by addition of an oil-soluble, sparingly water-soluble free radical initiator. The oil-soluble, sparingly water-soluble free radical initiators are preferably added continuously during the addition of the second monomer batch for subsequent activation after the polymerization with the water-soluble redox system, and the polymerization is completed therewith.

Suitable oil-soluble, sparingly water-soluble free radical initiators are, for example, customary organic peroxides, such as dibenzoyl peroxide, di-tertbutyl peroxide, tert-butyl hydroperoxide, cumyl hydroperoxide or bis-cyclohexyl peroxydicarbonate. Here, sparingly water-soluble is intended to mean that less than 1% of the organic peroxide is completely soluble in water at room temperature.

In this case, polymerization is first carried out, for example, with hydrogen peroxide and iron(II)sulfate, based on monomer used, and, for example, an oil-soluble, sparingly water-soluble organic peroxide is then added for subsequent activation, it being possible to achieve a conversion >99.8% and a residual monomer content <100 ppm and to dispense with monomer removal.

The copolymerization in the second polymerization stage may further be effected in the presences of a chain transfer agent. Suitable chain transfer agents are, for example, sulfur compounds, e.g. mercaptans, di and polysulfides, esters and sulfides of thio- and dithiocarboxylic acids and enol sulfides. Halogen compounds, aldehydes, ketones, formic acid, enol ethers, enamines, hydroxylamine, halogenated hydrocarbons, alcohols, ethylbenzene and xylene may also be used. Examples of regulators based on sulfur containing organic compounds include mercaptoethanol, mercaptopropanol, mercaptobutanol, thioglycolic acid, thioacetic acid, thiopropionic acid, 1-dodecanthiol, thioethanolamine, sodium di-methyidithiocarbamate, cysteine, ethyl thioglycolate, trimethylolpropane trithioglycolate, pentaerythrityl tetra (mercaptopropionate), pentaerythrityl tetrathioglycolate, trimethylolpropane tri(mercaptoacetate), butyl methylenebi-sthioglycolate, thioglycerol, glyceryl monothioglycolate, n-octadecyl mercaptan, n-dodecyl mercaptan, tert-dodecyl mercaptan, butyl mercaptan, thiophenol, mercaptotrimethoxysilane and acetylcysteine. Preferably the chain transfer agent is dodecyl mercaptane.

The concentration of polymer in the obtained aqueous polymer dispersion (A) is typically between 10 and 50% by weight, preferably between 20 and 40% by weight.

The obtained aqueous polymer dispersion (A) has a very small particle size of D50 of less than 65 nm, preferably from 50 to 10 nm, most preferably from 30 to 10 nm. D90 is less than 110 nm, preferably less than 75 nm, most preferably less than 50 nm. The particle size can be determined, for example, by laser correlation spectroscopy or by turbidity measurement.

The present aqueous polymer dispersions are suitable for surface sizing of cellulosic products, in particular all paper and paper board qualities produced in practice, which may be unsized or may be presized in the paper pulp, for example with alkylketene dimer or alkenylsuccinic anhydride.

The specific techniques used to size paper and other cellulosic products such as cardboard, include, but are not limited to, those techniques that are commonly employed in papermaking to apply the sizing composition to the cellulose-based product. For instance, the aqueous sizing composition may be applied to the surface of the paper using a puddle or film size press or a size press by using a calender or a doctor knife blade. Alternatively, the sizing composition may be sprayed onto the paper web or be applied by dipping the paper into the aqueous surface sizing composition. Paper or other cellulosic product treated with the surface sizing solution is then dried at elevated temperatures, typically temperature of the paper is from 80 to 110° C. Drying the paper web is sufficient to bring the surface size and surface strength to full development.

Provided herein is a sizing composition comprising an aqueous polymer dispersion as defined herein. The sizing composition is typically provided in an aqueous liquid vehicle, as an aqueous solution or dispersion, although small amounts of water-soluble or water miscible organic solvent (s) may also be present. The surface sizing composition solution typically includes, along with the sizing compounds, starch. Typically the aqueous dispersion is applied on the surface in a starch solution. The starch may be modified, for example, degraded, oxidized, cationized, dextrin, or otherwise derivatized starch or treated with a combination of the different starch treatments. The starch concentration is preferably from 1% to 30%, more preferably from 5 to 25% and the sizing agent, i.e. the core-shell polymer particle, concentration is from 0.1 to 20% by weight, preferably 0.5 to 5.0% by weight, based on the weight of dry starch.

The sizing composition disclosed herein also may be used in conjunction with or serially with other additives conventionally used in the production of paper and other cellulosic products. Such additional additives commonly known in the art include, but are not limited to, dispersing agents, anti-foaming agents, colorants, inorganic pigments and fillers, anti-curl agents, additional conventional components such as surfactants, plasticizers, humectants, defoamers, UV absorbers, light fastness enhancers, polymeric dispersants, dye mordants, optical brighteners, leveling agents, rheology modifiers, strength additives, and aluminum compounds to enhance the sizing performance, and improve runnability of a size press, and otherwise adjust the surface properties.

The present invention further provides a method of surface sizing a cellulosic product, in particular paper, board or cardboard, comprising applying, typically to at least one surface of the cellulosic product, an aqueous polymer dispersion as defined herein or a sizing composition comprising an aqueous polymer dispersion as defined herein. Further accordingly provided herein is a paper surface-sized with aqueous polymer dispersions as defined herein.

Accordingly further provided herein is a cellulosic product surface-sized with an aqueous polymer dispersion as defined herein or a surface sizing composition comprising an aqueous polymer dispersion as defined herein.

The paper, paper board or other cellulosic product onto which the surface sizing composition comprising the present aqueous polymer dispersions is applied may vary widely and is independent of the kind of pulp used to make the paper. Surface sizing compositions comprising the present aqueous polymer dispersions disclosed herein are suitable for the preparation of sized paper of any thickness and of any kind and thus applicable to papers or cardboards obtained from any specific paper pulp and mixtures thereof. The present aqueous polymer dispersions are particularly suitable for surface sizing cellulosic products when the cellulosic product comprises recycled fiber.

The paper or other cellulosic product also may contain additives such as fillers, dyestuffs, paper strengthening agents, drainage rate improvers, and internal sizing agents.

Water absorptiveness of paper surface sized with the present surface size composition can be determined using the Cobb 60 method, ISO 535:1991(E), at 23° C., 50% relative humidity.

EXAMPLES

A series of cationic copolymers were prepared and tested as surface sizes. The sizing efficiency was determined by measuring Cobb60 sizing degree according to standard ISO 535:1991(E), at 23° C. and 50% relative humidity. The particle sizes of the samples were measured using Zetasizer Nano-device. The glass transition temperatures of the samples were measured from freeze dried samples using a differential scanning calorimeter (DSC). The solids contents of the new surface sizes were measured using a Mettler Toledo Halogen moisture analyzer.

The surface sizes and formulates were tested for the surface size application using an internally unsized, recycled fiber linerboard with base weight of ca. 100 g/m². Mathis size presses were used in these tests. The surface size was added to surface size starch (C*film 07311) solution at 18% solids content. Hydrophobic polymers were added at concentrations of 1.5, 3.0 and 4.5 weight %. Sizing tests were carried out at 60° C. temperature. Temperature of the size press nip was measured with Reatec NO1 temperature indicator strips and temperature of the water bath for size press rolls was adjusted to obtain the desired temperature. The sheets were run through a horizontal pond size press at 2 m/min (2 Bar). The sheets were dried at 95° C. 1 min/side either using a contact dryer or a drum dryer. Temperature of the dryers was adjusted using Reatec NO82 temperature indicator strips. The sizing efficiency was determined by measuring Cobb60 sizing degree according to standard ISO 535.

Table 1 collectively shows the solids content (%), and particle size of the prepared copolymers in nanometers, and FIG. 1 collectively shows the water absorptiveness as determined by the Cobb method.

TABLE 1

| Sample  | Solids content (%) | D90 | D50 |
|---------|--------------------|-----|-----|
| 1       | 29.8               | 34  | 19  |
| 2       | 29.9               | 42  | 22  |
| 3       | 30.8               | 38  | 18  |
| 4 (ref) | 30.7               | 462 | 298 |
| 5 (ref) | 30.5               | 35  | 19  |
| 6 (ref) | 29.9               | 407 | 268 |
| 7       | 30.7               | 67  | 36  |
| 8       | 30.8               | 68  | 37  |

As can be seen from Table 1 and FIG. 1 the Examples 1 to 3 representing the present invention have a smaller particle size and provide a sizing efficiency better than copolymers comprising tertiary amines or having a larger particle size.

Example 1

18.1 g of acetic acid and 45.2 g of acetic anhydride were weighed in to a 1 L glass reactor with a cooling/heating jacket. The jacket was heated to 117° C. Nitrogen atmosphere was kept in the reactor and stirring was continued throughout the reaction. After the jacket had reached its goal temperature, chemical feeds into the reactor were started. Monomer feed consisting of 86.0 g styrene and 1.39 g dodecyl mercaptane was fed in 120 minutes. 2nd monomer feed consisting of 39.9 g of 80% [2-(acryloyloxy)ethyl] trimethyl ammonium chloride was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 115° C. during the feeds and for 30 minutes after the feeds ended. Then 518 g of heated demineralized water was added into the reactor and a 37.1 g sample of the prepolymer was taken out. After the temperature had stabilized to 85° C., 2.15 g of 2.56% strength aqueous solution of ferrous (II) sulfate heptahydrate was added in to the reactor. After 15 minutes, the chemical feeds were started. Monomer mixture consisting of 52.4 g of n-butyl acrylate, 52.4 g of tert-butyl acrylate and 68.9 g of styrene was fed in during 150 minutes. 36.5 g of 5% solution of hydrogen peroxide was fed simultaneously with the monomer feeds during 150 minutes. Temperature was kept at 85° C. during the feeds and 10 minutes after the feeds ended. Then 42.4 g of 4.38% strength tert-butyl hydroperoxide solution was added into the reactor during 15 minutes. The temperature was kept at 85° C. for further 60 minutes. Thereafter, cooling was effected to room temperature and pH was adjusted to 3 with 10% strength sodium hydroxide solution. Filtration was performed using a 100 μm filter cloth. A finely divided dispersion was obtained.

Example 2

13.1 g of acetic acid and 50.3 g of acetic anhydride were weighed in to a 1 L glass reactor with a cooling/heating jacket. The jacket was heated to 117° C. Nitrogen atmosphere was kept in the reactor and stirring was continued throughout the reaction. After the jacket had reached its goal temperature, chemical feeds into the reactor were started. Monomer feed consisting of 86.0 g styrene and 1.39 g dodecyl mercaptane was fed in 120 minutes. 2nd monomer feed consisting of 44.3 g of 80% [2-(acryloyloxy)ethyl] trimethyl ammonium chloride was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 115° C. during the feeds and for 30 minutes after the feeds ended. Then 518 g of heated demineralized water was added into the reactor and a 37.3 g sample of the prepolymer was taken out. After the temperature had stabilized to 85° C., 2.12 g of 2.56% strength aqueous solution of ferrous (II) sulfate heptahydrate was added in to the reactor. After 15 minutes, the chemical feeds were started. Monomer mixture consisting of 52.4 g of n-butyl acrylate, 52.4 g of tert-butyl acrylate and 68.9 g of styrene was fed in three parts: ⅓ was fed first during 25 minutes, ⅓ was then fed during 50 minutes and ⅓ was fed during 75 minutes. 36.5 g of 5% solution of hydrogen peroxide was fed simultaneously with the monomer feeds during 150 minutes with a constant speed. Temperature was kept at 85° C. during the feeds and 10 minutes after the feeds ended. Then 42.4 g of 4.38% strength tert-butyl hydroperoxide solution was added into the reactor during 15 minutes. The temperature was kept at 85° C. for further 60 minutes. Thereafter, cooling was effected to room temperature and pH was adjusted to 3 with 10% strength sodium hydroxide solution. Filtration was performed using a 100 μm filter cloth. A finely divided dispersion was obtained.

Example 3

18.1 g of acetic acid and 45.2 g of acetic anhydride were weighed in to a 1 L glass reactor with a cooling/heating jacket. The jacket was heated to 117° C. Nitrogen atmosphere was kept in the reactor and stirring was continued throughout the reaction. After the jacket had reached its goal temperature, chemical feeds into the reactor were started. Monomer feed consisting of 86.0 g of styrene and 1.39 g dodecyl mercaptane was fed in 120 minutes. 2nd monomer feed consisting of 39.9 g of 80% [2-(acryloyloxy)ethyl] trimethyl ammonium chloride was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 115° C. during the feeds and for 30 minutes after the feeds ended. Then 518 g of heated demineralized water was added into the reactor and a 37.1 g sample of the prepolymer was taken out. After the temperature had stabilized to 85° C., 2.15 g of 2.56% strength aqueous solution of ferrous (II) sulfate heptahydrate was added in to the reactor. After 15 minutes, the chemical feeds were started. Monomer mixture consisting of 52.4 g of n-butyl acrylate, 52.4 g of tert-butyl acrylate and 68.9 g of styrene was fed in three parts: ⅓ was fed first during 25 minutes, ⅓ was then fed during 50 minutes and ⅓ was fed during 75 minutes. 36.5 g of 5% solution of hydrogen peroxide was fed simultaneously with the monomer feeds during 150 minutes with a constant speed. Temperature was kept at 85° C. during the feeds and 10 minutes after the feeds ended. Then 42.4 g of 4.38% strength tert-butyl hydroperoxide solution was added into the reactor during 15 minutes. The temperature was kept at 85° C. for further 60 minutes. Thereafter, cooling was effected to room temperature and pH was adjusted to 3 with 10% strength sodium hydroxide solution. Filtration was performed using a 100 μm filter cloth. A finely divided dispersion was obtained.

Comparative Example 4

63.4 g of acetic acid and 1.39 g of dodecyl mercaptan were weighed in to a 1 L glass reactor with a cooling/heating jacket and a stirrer. The jacket was heated to 95° C. Nitrogen atmosphere was kept in the reactor and stirring was continued throughout the reaction. After the jacket had reached its goal temperature, chemical feeds into the reactor were started. Monomer feed consisting of 86.0 g styrene was fed in 120 minutes. 2nd monomer feed consisting of 44.3 g of 80% [2-(acryloyloxy)ethyl] trimethyl ammonium chloride was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 95° C. during the feeds and for 30 minutes after the feeds ended. Then 510 g of heated demineralized water was added into the reactor and a 30.4 g sample of the prepolymer was taken out. After the temperature had stabilized to 85° C., 2.15 g of 2.56% strength aqueous solution of ferrous (II) sulfate heptahydrate was added in to the reactor. After 15 minutes, the chemical feeds were started. The monomer mixture (52.4 g of n-butyl acrylate, 52.4 g of tert-butyl acrylate and 68.9 g of styrene) was fed during 150 minutes. 36.5 g of 5% solution of hydrogen peroxide was fed simultaneously with the monomer feeds during 150 minutes with a constant speed. Temperature was kept at 85° C. during the feeds and 10 minutes after the feeds ended. Then 42.4 g of 4.38% strength tertbutyl hydroperoxide solution was added into the reactor during 15 minutes. The temperature was kept at 85° C. for further 60 minutes. Thereafter, cooling was effected to room temperature. Filtration was performed using a 100 μm filter cloth. A finely divided dispersion was obtained.

Comparative Example 5

63.4 g of acetic acid and 1.39 g of dodecyl mercaptan were weighed in to a 1 L glass reactor with a cooling/heating jacket and a stirrer. The jacket was heated to 95° C. Nitrogen atmosphere was kept in the reactor and stirring was continued throughout the reaction. After the jacket had reached its goal temperature, chemical feeds into the reactor were started. Monomer feed consisting of 86.0 g styrene, 15.6 g 3-dimethylaminopropyl methacrylamide and 14.4 g 2-(dimethylamino)ethyl methacrylate was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 95° C. during the feeds and for 30 minutes after the feeds ended. Then 519 g of heated demineralized water was added into the reactor and a 36.6 g sample of the prepolymer was taken out. After the temperature had stabilized to 85° C., 2.15 g of 2.56% strength aqueous solution of ferrous (II) sulfate heptahydrate was added in to the reactor. After 15 minutes, the chemical feeds were started. The monomer mixture (52.4 g of n-butyl acrylate, 52.4 g of tert-butyl acrylate and 68.9 g of styrene) was fed during 150 minutes. 36.5 g of 5% solution of hydrogen peroxide was fed simultaneously with the monomer feeds during 150 minutes with a constant speed. Temperature was kept at 85° C. during the feeds and 10 minutes after the feeds ended. Then 42.4 g of 4.38% strength tert-butyl hydroperoxide solution was added into the reactor during 15 minutes. The temperature was kept at 85° C. for further 60 min. Thereafter, cooling was effected to room temperature. Filtration was performed using a 100 μm filter cloth. A finely divided dispersion was obtained.

Comparative Example 6

63.4 g of acetic acid and 1.39 g dodecyl mercaptane were weighed in to a 1 L glass reactor with a cooling/heating jacket. The jacket was heated to 100° C. Nitrogen atmosphere was kept in the reactor and stirring was continued throughout the reaction. After the jacket had reached its goal temperature, chemical feeds into the reactor were started. Monomer feed consisting of 86.0 g styrene and 14.4 g dimethylaminoethyl methacrylate was fed in 120 minutes. 2nd monomer feed consisting of 22.2 g of 80% [2-(acryloyloxy)ethyl] trimethyl ammonium chloride was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 95° C. during the feeds and for 30 minutes after the feeds ended. Then 519 g of heated demineralized water was added into the reactor and a 37 g sample of the prepolymer was taken out. After the temperature had stabilized to 85° C., 2.15 g of 2.56% strength aqueous solution of ferrous (II) sulfate heptahydrate was added in to the reactor. After 15 minutes, the chemical feeds were started. Monomer mixture consisting of 52.4 g of n-butyl acrylate, 52.4 g of tert-butyl acrylate and 68.9 g of styrene was fed in 150 minutes with constant speed. 36.5 g of 5% solution of hydrogen peroxide was fed simultaneously with the monomer feeds during 150 minutes with a constant speed. Temperature was kept at 85° C. during the feeds and 10 minutes after the feeds ended. Then 42.4 g of 4.38% strength tert-butyl hydroperoxide solution was added into the reactor during 15 minutes. The temperature was kept at 85° C. for further 60 minutes. Thereafter, cooling was effected to room temperature. Filtration was performed using a 100 μm filter cloth. A finely divided dispersion was obtained.

Example 7

37.7 g of acetic acid and 25.7 g of acetic anhydride were weighed in to a 1 L glass reactor with a cooling/heating jacket. The jacket was heated to 117° C. Nitrogen atmosphere was kept in the reactor and stirring was continued throughout the reaction. After the jacket had reached its goal temperature, chemical feeds into the reactor were started. Monomer feed consisting of 86.0 g styrene, 7.2 g of dimethylaminoethyl methacrylate and 1.4 g dodecyl mercaptane was fed in 120 minutes. 2nd monomer feed consisting of 33.2 g of 80% [2-(acryloyloxy)ethyl] trimethyl ammonium chloride was fed in 120 minutes. A feed consisting of 31.0 g of acetic acid and 1.72 g of 2,2'-azobis(2-methylpropionitrile) was fed simultaneously during the monomer feeds and continued for 120 minutes after the monomer feeds ended. Temperature in the reactor was kept at 115° C. during the feeds and for 30 minutes after the feeds ended. Then 518 g of heated demineralized water was added into the reactor and a 37.1 g sample of the prepolymer was taken out. After the temperature had stabilized to 85° C., 2.15 g of 2.56% strength aqueous solution of ferrous (II) sulfate heptahydrate was added in to the reactor. After 15 minutes, the chemical feeds were started. Monomer mixture consisting of 52.4 g of n-butyl acrylate, 52.4 g of tert-butyl acrylate and 68.9 g of styrene was fed in three parts: ⅓ was fed first during 25 minutes, ⅓ was then fed during 50 minutes and ⅓ was fed during 75 minutes. 36.5 g of 5% solution of hydrogen peroxide was fed simultaneously with the monomer feeds during 150 minutes with a constant speed. Temperature was kept at 85° C. during the feeds and 10 minutes after the feeds ended. Then 42.4 g of 4.38% strength tert-butyl hydroperoxide solution was added into the reactor during 15 minutes. The temperature was kept at 85° C. for further 60 minutes. Thereafter, cooling was effected to room temperature and pH was adjusted to 3 with 10% strength sodium hydroxide solution. Filtration was performed using a 100 μm filter cloth. A finely divided dispersion was obtained.

Example 8

7.5 g of propionic acid and 58.5 g of propionic anhydride were weighed in to a 1 L glass reactor with a cooling/heating jacket. The jacket was heated to 117° C. Nitrogen atmosphere was kept in the reactor and stirring was continued throughout the reaction. After the jacket had reached its goal temperature, chemical feeds into the reactor were started. Monomer feed consisting of 103.6 g styrene and 1.68 g dodecyl mercaptane was fed in 120 minutes. 2nd monomer feed consisting of 53.4 g of 80% [2-(acryloyloxy)ethyl] trimethyl ammonium chloride was fed in 120 minutes. A feed consisting of 21.7 g of propionic anhydride and 2.08 g of 2,2'-azobis(2-methylpropionitrile) was fed simultaneously during the monomer feeds and continued for 120 minutes after the monomer feeds ended. Temperature in the reactor was kept at 115° C. during the feeds and for 30 minutes after the feeds ended. Then 655 g of heated demineralized water was added into the reactor and a 135 g sample of the prepolymer was taken out. After the temperature had stabilized to 85° C., 2.06 g of 2.86% strength aqueous solution of ferrous (II) sulfate heptahydrate was added in to the reactor. After 15 minutes, the chemical feeds were started. Monomer mixture consisting of 56.4 g of n-butyl acrylate, 56.4 g of tert-butyl acrylate and 74.2 g of styrene was fed in three parts: ⅓ was fed first during 25 minutes, ⅓ was then fed during 50 minutes and ⅓ was fed during 75 minutes. 39.3 g of 5% solution of hydrogen peroxide was fed simultaneously with the monomer feeds during 150 minutes with a constant speed. Temperature was kept at 85° C. during the feeds and 10 minutes after the feeds ended. Then 45.7 g of 4.38% strength tert-butyl hydroperoxide solution was added into the reactor during 15 minutes. The temperature was kept at 85° C. for further 60 minutes. Thereafter, cooling was effected to room temperature and pH was adjusted to 3 with 10% strength sodium hydroxide solution. Filtration was performed using a 100 μm filter cloth. A finely divided dispersion was obtained.

It will be obvious to a person skilled in the art that, as technology advances, the inventive concept can be implemented in various ways. The invention and its embodiments are not limited to the examples described above but may vary within the scope of the claims.

The invention claimed is:

1. A process for preparation of an aqueous polymer dispersion (A), the method comprising:
  free radical polymerizing, in a polymerization solvent having $C_{1-6}$-carboxylic acid and $C_{1-6}$-carboxylic acid anhydride, in a presence of a second free radical initiator a second ethylenically unsaturated monomer blend having:
  (i) 5 to 50% by weight of at least one ethylenically unsaturated quarternary amine selected from quaternary salt of N,N,N-tri($C_{1-4}$-alkyl)amino $C_{1-4}$-alkylmethacrylate or acrylate with a mineral acid or an organic acid and/or quaternary salt of N,N,N-tri($C_{1-4}$-alkyl)amino $C_{1-4}$-alkyl(meth)acrylamide with a mineral acid or an organic acid,
  (ii) 0 to 40% by weight of at least one ethylenically unsaturated tertiary amine selected from N,N-di($C_{1-4}$-alkyl)amino $C_{1-4}$-alkylmethacrylate or acrylate and/or N,N-di($C_{1-4}$-alkyl)amino $C_{1-4}$-alkyl(meth)acrylamide, (iii) 10 to 95% by weight of at least one optionally substituted styrene, (iv) 0 to 50% by weight of at least one $C_1$-$C_4$-alkyl methacrylate or acrylate, and (v) 0 to 10% by weight of other ethylenically unsaturated copolymerizable monomers, wherein a sum of (i)+(ii)+(iii)+(iv)+(v) is 100%;

adding water to an obtained polymer composition to obtain an aqueous prepolymer composition (B); and copolymerizing in a presence of said aqueous prepolymer composition (B) and a water-soluble redox system having a first free radical initiator for the free radical emulsion copolymerization of a first ethylenically unsaturated monomer blend having:

(a) 0 to 75% by weight of at least one optionally substituted styrene, (b) 15 to 100% by weight of at least one $C_1$-$C_4$-alkyl methacrylate or acrylate, and (c) 0 to 10% by weight of other ethylenically unsaturated copolymerizable monomers, wherein a sum of (a)+(b)+(c) is 100%, to obtain the aqueous polymer dispersion (A).

2. The process as claimed in claim 1, wherein a particle size D50 of the aqueous polymer dispersion (A) is less than 65 nm.

3. The process as claimed in claim 1, wherein an amount of monomer component (i) is 15 to 30% by weight of a total weight of the second ethylenically unsaturated monomer blend.

4. The process as claimed in claim 1, wherein the ethylenically unsaturated quaternary amine (i) is [2-(methacryloyloxy)ethyl] trimethylammonium chloride or [2-(acryloyloxy)ethyl]-trimethylammoniumchloride.

5. The process as claimed in claim 1, wherein the $C_{1-6}$-carboxylic acid is acetic acid.

6. The process as claimed in claim 1, wherein the $C_{1-6}$-carboxylic anhydride is acetic anhydride.

7. The process as claimed in claim 1, wherein an amount of monomer component (ii) is 0%.

8. The process as claimed in claim 1, wherein an amount of monomer component (iii) is 60 to 80% by weight of a total weight of the second ethylenically unsaturated monomer blend.

9. The process as claimed in claim 1, wherein an amount of monomer component (iv) is 0%.

10. The process as claimed in claim 1, wherein an amount of monomer component (v) is 0%.

11. The process as claimed in claim 1, wherein monomer component (b) is a mixture of at least two isomeric butyl acrylates and monomer component (iv) is a mixture of at least two isomeric butyl acrylates.

12. The process as claimed in claim 1, wherein monomer component (b) is at least one of tert-butyl acrylate and tert-butyl methacrylate.

13. The process as claimed in claim 1, wherein an amount of monomer component (b) is over 50% by weight of a total weight of the first ethylenically unsaturated monomer blend.

14. The process as claimed in claim 1, wherein the water-soluble redox system is a combination of hydrogen peroxide and at least one metal ion selected from a group consisting of cerium, manganese, and iron(II).

* * * * *